United States Patent [19]

Bernier et al.

[11] Patent Number: 4,937,213

[45] Date of Patent: Jun. 26, 1990

[54] PROCESS FOR PREPARING TITANATES AND ZIRCONATES

[75] Inventors: Jean-Claude Bernier, Lincolsheim; Paul J. L. Poix, Lingolsheim; Jean L. Rehspringer, Obernai, all of France

[73] Assignee: Centre National de la Recherche Scientifique, Paris, France

[21] Appl. No.: 237,691

[22] Filed: Aug. 25, 1986

Related U.S. Application Data

[63] Continuation of Ser No. 878,848, filed as PCT FR85/00286 on Oct. 11, 1985 published as WO86/02345 on Apr. 24, 1986 abandoned.

[30] Foreign Application Priority Data

Oct. 15, 1984 [FR] France ................................ 84 15748

[51] Int. Cl.$^5$ ...................... C04B 35/48; C04B 35/49; C04B 35/46
[52] U.S. Cl. .................................... 501/104; 501/135; 501/136; 501/137; 423/598
[58] Field of Search ................. 423/598; 501/137, 104, 501/135, 136

[56] References Cited

U.S. PATENT DOCUMENTS 3,331,659  7/1967  Malloy ..................................... 23/51
4,520,114  5/1985  David ..................................... 501/103
4,636,378  1/1987  Pastor et al. ......................... 501/137
4,636,908  1/1987  Yoshihara et al. ................... 501/136
4,670,243  6/1987  Wilson et al. ........................ 423/598
4,713,233  12/1987 Marsh et al. ......................... 423/266

OTHER PUBLICATIONS

*Ultrastructure Processing of Ceramics, Glasses, and Composites*, eds: L. Hench et al., John Wiley & Sons, NY (1984), pp. 108, 152-160.

Primary Examiner—Brian E. Hearn
Assistant Examiner—Andrew Griffis
Attorney, Agent, or Firm—Larson and Taylor

[57] ABSTRACT

The invention concerns a process for preparing titanates and zirconates respectively of formulas $MTiO_3$ and $MZrO_3$ where M is $Ba^{2+}$, $Sr^{2+}$, $Ca^{2+}$, $Pb^{2+}$ and $Mg^{2+}$ to the exclusion of $MgZrO_3$, consisting of reacting an ester of formula $M[H-(CH_2)_nCO_2]_2$ where n=1-4 with the formula $M'[O(CH_2)_nCH_2)_nCH_3]_4$ where M' is Ti or Zr bringing the reaction mixture to boil until the solvent is removed to yield a viscous translucent resin. The resin is cooled and further treated to obtain the desired product.

13 Claims, No Drawings

PROCESS FOR PREPARING TITANATES AND ZIRCONATES

This application is a continuation of application Ser. No. 878,848, filed as PCT FR85/00286 on Oct. 11, 1985, published as WO86/02345 on Apr. 24, 1986, now abandoned.

The present invention relates to a process for preparing titanates and zirconates respectively of formulas $MTiO_3$ and $MZrO_3$ where M is a divalent metal selected from the group constituted by barium, strontium, calcium, lead and magnesium.

It has a particularly interesting application in the preparation of barium titanate $BaTiO_3$.

It is known that barium titanate $BaTiO_3$, is, owing to its ferro-electric properties and its high dielectric constant, the base material of dielectric ceramics which have a wide application in the realization of electronic components.

One can imagine the interest of having available a process for preparing $BaTiO_3$ which is easy to carry out and permits the obtainment of a product of high purity and the regulation of its stoichiometry, i.e. the molar ratio $BaO/TiO_2$.

Many studies have been carried out for perfecting more or less elaborate processes for preparing $BaTiO_3$ which can satisfy these objectives.

K. S. Mazdiyasni, R. T. Dolloff and J. S. Smith describe in the "Journal of the American Ceramic Society" (Vol. 52, No. 10, p. 523 to 526—1969) a process for preparing $BaTiO_3$ comprising hydrolizing a mixture of barium alkoxide and titanium alkoxide which process permits the obtainment of a stoichiometric titanate int he form of a very fine powder of high purity.

K. Kiss, J. Magder, M. S. Vukasovich and R. Lockhart in the "Journal of the American Ceramic Society" (Vol. 49, No. 6, p. 291 to 295—1966) recommend, for the preparation of a fine powder of $BaTiO_3$ of high purity, the hydrolysis of a titanium alkoxide by an aqueous or hydroalcoholic solution of $Ba(OH)2$.

There must also be mentioned U.S. Pat. No. 3 331 659 which more particularly discloses a process for preparing lead titanate $PbTiO_3$. According to the process disclosed in this patent, a titanium alkoxide dissolved in kerosene is reacted with lead formiate $Pb(-H-COO)_2$ in the presence of a de-alkoxylation agent such as acetic acid. The reaction is carried out in a heterogeneous medium, i.e. the lead formate is in suspension in the kerosene. A powder of $PbTiO_3$ is formed which is separated out by filtration, washed with carbon tetrachloride so as to eliminate the kerosene, dried and then treated with water vapour at 200° C.

This process, which is limited to the preparation of lead zirconate and titanate, is relatively long to carry out with a final treatment of the powder with water vapour at 200° C. whose purpose is unclear, employs reagents the handling of which is not very easy, such as lead formate, uses toxic solvents such as kerosene and carbon tetrachloride. The use of the latter solvent may subsequently result in the introduction of chlorine into the crystal cell of the $PbTiO_3$ and produce an expansion of the crystal lattice.

The process according to the invention, which is generally applicable to the preparation of titanates and zirconates $MTiO_3$ and $MZrO_3$, has the advantage over these prior processes of being simpler to carry out and of using cheap and non-toxic ordinary reagents.

The process according to the invention is characterized in that it comprises of successively:

preparing an ester of formula $$M [H—(CH_2)_n CO_2]_2$$

where n=1–4 and M has the signification given above, by attack of a salt of the metal, such as $BaCO_3$; $MgCO_3$; $Pb(OH)_2$, $2PbCO_3$, $SrCO_3$; $CaCO_3$; with an organic acid of formula $H—(CH_2)_n—COOH$ where n has the signification given above, the ester being soluble in its corresponding acid and in the medium in which it has to react, reacting said ester with an alkoxide satisfying one of the following formulas:

$$Ti [O(CH_2)_n CH_3]_4$$

$$Zr [O(CH_2)_n CH_3]_4$$

where n has the signification given above, in the presence of an organic solvent, the reaction resulting in a clear solution, bringing the reaction mixture to the boil until the formation of a resin having a high viscocity when hot, solidifying said resin by cooling, crushing said resin or reducing it to a powder by adding liquid nitrogen, and treating the crushed or powdered resin so as to obtain the desired compound.

When applied to the preparation of barium titanate $BaTiO_3$, the process according to the invention comprises the following successive steps:

in a first step, the ester is prepared, for example by attack of a barium salt such as $BaCO_3$ by an organic acid, such as propionic acid according to the following reaction diagram:

$$2C_2H_5COOH + BaCO_3 \rightarrow (C_2H_5COO)_2Ba + CO_2 + H_2O$$

$CO_2$ and $H_2O$ being eliminated by heating to 100°–120° C.

in a second step, the titanium alkoxide, such as titanium ethoxide $Ti(C_2H_5))_4$ is reacted with the ester, $$(C_2H_5COO)_2Ba + Ti (C_2H_5O)_4 \rightarrow \text{mixed polycondensation}$$

in the presence of an organic solvent such as isopropanol, in a third step, the reaction mixture is brought to the boil and the excess solvents are evaporated until the formation of a translucent resin of high viscosity (>300 cp) which is solidified by cooling and finally crushed, in a last step, the resin is treated so as to obtain the barium titanate.

The resin may be treated in accordance with two methods.

In a first method, the resin is put back into solution, for example in methyl alcohol $CH_3OH$, then the solution is hydrolized in the form of a gel; this hydrolysis may be ac celerated by the action of ultra-sounds.

In a second method, the resin is subjected to a slow pyrolysis in air by slowly raising the temperature to a temperature between 600° C. and 800° C. within a few hours.

According to an important complementary characteristic of the invention, the barium titanate $BaTiO_3$ obtained is subjected to an calcination at a temperature of between 600° C. and 700° C., which permits the obtainment of microcrystallized $BaTiO_3$ having a mean diameter of 0.5 $\mu$.

Among the barium salts which may be suitable for the preparation of the ester, there may be mentioned barium carbonate, barium oxide or barium hydroxide. However, there is preferably employed barium carbonate which is the most stable substance and the best defined chemically. Oxides and hydroxides indeed have a high propensity to be carbonated, i.e. to be transformed into carbonates and therefore into a composition of poorly defined barium.

In this respect, it must be noted that it is unnecessary to use a barium carbonate of very high purity, which is an expensive product. Indeed, according to an interesting feature of the process, it is possible to use a less pure carbonate, i.e. an ordinary barium carbonate which usually contains a small proportion of carbonate of strontium and calcium (1 to 3%). When preparing the ester by the action of propionic acid for example, on barium carbonate, the barium carbonate is attacked selectively. The strontium and calcium carbonates which remain in suspension are then eliminated by simple filtration. In this way, a "self-purification" of the barium carbonate is achieved.

Among the acids suitable for the preparation of the ester, there may be mentioned acetic acid, propionic acid, butyric acid, valeric acid.

The powders of $BaTiO_3$ obtained by the process according to the invention have the advantage of being capable of sintering at lower temperature without a sintering aid. The gain in temperature is on the order of 200° C. to 300° C. with respect to commercially available $BaTiO_3$ which sinters at 1300° C. to 1350° C. Independently of the great saving in energy represented by this lowering of the sintering temperature, this lowering is of great interest in particular when producing multi-layer capacitors. These capacitors are constituted by a stack of layers of dielectric ceramics based on $BaTiO_3$ alternating with metal layers constituting the electrodes which are co-sintered at the same time as the ceramic layers. In view of the high sintering temperature (1300° C. to 1350° C. ), only precious metals such as platinum, palladium, silver or gold and alloys thereof are suitable.

The lowering of the sintering temperature obtained by using the powders of $BaTiO_3$ according to the invention enables these precious metals to be replaced by refractory metals such as molybdenum, tungsten or by refractory alloys such as nichrome (20–80) or kanthal, which results in a notable reduction in the cost price of the capacitors; the electrodes of precious metals may represent up to 70% of this price.

The process according to the invention, has, moreover, the advantage of permitting the easy obtainment of barium titanate having a variable stoichiometry, and consequently the preparation of powders of $BaTiO_3$ in which the molar ratio $BaO/TiO_3$ will be advantageously between 0.8 and 1.2, between which limits are situated the best densification conditions.

In order to be transformed into a dielectric ceramic, the powders of $BaTiO_3$ according to the invention are conventionally subjected to a compacting operation by compression and sintering. As mentioned above, these powders have a privileged application in the production of multi-layer capacitors. In the latter application, it is possible to form thin layers of resin by dissolving and evaporating the solvent and then subjecting said layers to a heat treatment giving $BaTiO_3$ in a layer. In this respect, it must be mentioned that the fine size of the particles of $BaTiO_3$ obtained by the process according to the invention facilitates the obtainment of thin layers, so that it is possible to produce compact multi-layer capacitors.

Although the process according to the invention has been described more particularly with respect to the preparation of barium titanate, it is applicable in the same way to the preparation of zirconates $MZrO_3$, to the exclusion of $MgZrO_3$ (which not exist).

The first step of the process which comprises of preparing the ester of formula $$M[H-(CH_2)_n CO_2]_2$$

is common to the preparation of the titanates $MTiO_3$ and the zirconates $MZrO_3$.

The esters of formula:

$$Ba[H-(CH_2)_n CO_2]_2$$

$$Mg[H-(CH_2)_n CO_2]_2$$

and $Pb[H-(CH_2)_n CO_2]_2$ are obtained by the attack of $BaCO_3$; $MgCO_3$; $Pb(OH)_2$, $2PbCO_3$ with an organic acid of formula $H-(CH_2)_n-COOH$, with no need to add water.

However, it is recommended when preparing the esters $$Sr[H-(CH_2)n CO_2[_2$$

and $Ca[H-(CH_2)_n CO_2[_2$ to add water to the organic acid. In this case, the excess water must be eliminated since it would cause the hydrolysis of the titanium or zirconium alkoxide. This is achieved by progressively adding for example propionic acid while evaporating the water until the complete elimination of the latter. There is thus prepared a solution of a salt of Sr or Ca, for example strontium or calcium propionate, in its acid, propionic acid.

It is also possible to start directly with the esters and to dissolve them in a small quantity of their corresponding acid: barium acetate in acetic acid, barium propionate in propionic acid, magnesium acetate in acetic acid, magnesium propionate in propionic acid, etc. From the point of view of cost price, it is however preferable to start with carbonates which are cheaper than esters. When the process is used for preparing the zirconates $MZrO_3$, a resin is prepared under the same conditions as those described for $BaTiO_3$ by reaction of the ester with an alkoxide such as zirconium isopropoxide which is treated as indicated before.

In this respect, note that zirconium is part of the category of cations forming part of the composition of a dielectric ceramic, since it serves to lower the ferroelectric temperature of the $BaTiO_3$ and therefore to shift the maximum of the dielectric constant of the $BaTiO_3$.

The process according to the invention has many advantages over prior processes:

the reaction between the ester and the alkoxide occurs in a homogeneous medium and results in a clear solution, the ester being soluble in its corresponding acid and in the solvent in which the titanium or zirconium alkoxide is dissolved, it permits operating in a very concentrated solution (by way of illustration, and as the examples will show, in starting with a 30 cc solution, 10 g of $BaTiO_3$ can be obtained; after elimination of the solvents, the remaining volume of resin is reduced to less than 15 cc), it employs cheap reagents, easily found on the market, it permits an intimate mixture of the two metals, it uses ordinary non-toxic solvents which may be easily recovered by heating.

Other features and advantages of the invention will be apparent from the modes of performing the invention given hereinafter as non-limiting examples.

EXAMPLE 1

Preparation of $BaTiO_3$ 1.97 g of dry $BaCO_3$ placed in a 250 cc beaker are disolved hot in 100 cc of propionic acid (n=2). There are then added to the solution obtained 2.27 g of titanium ethoxide (n=2) previously diluted in 50 cc of isopropanol. A limpid solution is obtained. This solution is evaporated until the obtainment of a viscous phase having a volume of about 10 cc and solidifying on cooling. The solid phase is slightly yellowish and transparent.

The product is recovered either by fracturing with liquid nitrogen, or by scraping, then pyrolized between 600° C. and 800° C. for a lapse of time of between 5 minutes and 120 minutes (depending on the desired degree of crystallinity). The final product is $BaTio_3$ devoid of impurities. 2.333 g of $BaTiO_3$ are obtained.

EXAMPLE 2a, 2b

Preparation of $SrTiO_3$ and $SrZrO_3$.

3.254 g of $SrCO_3$ are put into a 250 cc beaker and a diluted solution of propionic acid (or butyric, acetic acid) is added thereto. The volume of the added solution is 10 cc of water and 2 cc of propionic acid. The temperature of the mixture is raised. The reaction starts with a slight emanation of $CO_2$ which increases. A clear solution (no precipitate) is obtained.

The excess water would cause, which causes the hydrolysis of the titanium (or zirconium) alkoxide is eliminated. For this purpose, propionic (or butyric, acetic) acid is progressively added while maintaining the solution on the boil. The boiling temperature progressively changes from 100° C. to 140° C.; i.e. the vapours emanating from the boiling liquid become enriched with propionic (butyric, acetic) acid until the total elimination of the water. The vapours then have the temperature of 141° C. (boiling temperature of propionic acid). About 40 cc of acid were added. At the end of the elimination of the water, the residual volume containing the Sr propionate and the propionic acid is 20 cc (this volume could be still further reduced).

There is added to this solution of strontium propionate (or acetate or butyrate), a solution containing 7.220 g of zirconium isopropanolate or 5.023 g of titanium ethanolate dissolved in 10 cc of ethanol (or isopropanol). The solution thus mixed is brought to the boil until the obtainment, after elimination of the solvents, of a resin or a substance of high viscosity (400 to 600 cp) at temperatures of between 100° C. and 140° C. The residual volume of the resin is less than 15 cc for a starting volume of about 30 to 40 cc. On cooling, the resin solidifies. It is recovered by fracturing with liquid nitrogen. The powder decomposed between 600° C. and 800° C. results in $SrTiO_3$ ($SrZrO_3$) having high purity, a specific surface area of between 10 and 20 m²/g, and a particle size of between 0.1 and 0.5 μm.

The quantity of $SrZrO_3$ powder prepared by this process is 5 g.

The quantity of $SrTiO_3$ powder prepared by this process is 4.045 g.

EXAMPLE 3a, 3b

Preparation of $CaZrO_3$ and $CaTiO_3$

The process is identical to that described in the preceding example for preparing $SrTiO_3$, $SrZrO_3$.

The following quantities of reagents are used:
$CaCO_3$: 2.792 g
Zirconium isopropoxide: 9.136 g
Titanium ethoxide: 6.356 g The quantity of $CaZrO_3$ powder obtained is 5 g.
The quantity of $CaTiO_3$ powder obtained is 3.793 g.

The powders obtained have the same particle size and the same specific surface area as the powders prepared in the preceding example.

EXAMPLE 4

Preparation of $MgTiO_3$.

3.510 g of $MgCO_3$ are placed in a 250 cc beaker and 20 cc of propionic acid (or acetic, butyric acid) and 2 drops of water are added thereto. The mixture is brought to the boil. The solution becomes clear after the reaction (elimination of $CO_2$).

9.481 g of titanium ethoxide in 10 cc of ethanol (or isopropanol) are added to this solution. A clear solution is obtained. The latter is brought to tho boil (140° C.) until the obtainment, after elimination of the solvents, of a substance having a high viscosity at 140° C. (400-600 cp). The residual volume of resin is on the order of 15 cc for a starting volume of 40 cc. On cooling, the resin solidifies. After calcination at 650° C., there is obtained an $MgTiO_3$ powder having the same characteristics as those of the $SrTiO_3$ powder obtained in Example 2a.

The quantity of $MgTiO_3$ powder obtained is 5 g.

EXAMPLE 5

Preparation of $BaZrO_3$

The process is the same as that described in example 4 for preparing $MgTiO_3$, but without the addition of water when preparing the barium propionate.

The following quantities of reagents are used:
barium carbonate: 3.568 g
zirconium isopropoxide: 5.923 g 5 g of barium zirconate are obtained.

EXAMPLE 6

Preparation of $PbTiO_3$ and $PbZrO_3$

Lead hydroxycarbonate $Pb(OH)_2$, $2PbCO_3$ is here the starting material.

The process is identical to that described for preparing $BaZrO_3$.

For preparing the $PbZrO_3$ the following quantities of reagents are used:
$Pb(OH)_2$, $2PbCO_3$: 11.191 g
zirconium isopropoxide: 4.727 g.

After calcination of the final product at 650° C., 5 g of $PbZrO_3$ are obtained. The following quantities of reagents are used for preparing the $PbTiO_3$:
$Pb(OH)_2$, $2PbCO_3$:12,797 g
titanium ethoxide: 3.760 g.

After calcination of the final product at 650° C., 5 g of $PbTiO_3$ are obtained.

We claim:

1. A process for preparing titanates and zirconates respectively of formulas $MTiO_3$ and $MZrO_3$ wherein M is a divalent metal selected from the group consisting of barium, strontium, calcium, lead and magnesium to the exclusion of MgZrO$_3$, comprising:

preparing an ester of the formula:

M (RCOO)$_2$ wherein R is an alkyl or a substituted alkyl radical containing 1 to 4 carbon atoms by attack of a salt of the metal, with an organic acid of the formula:

R—COOH wherein R has the designation given above, the ester being soluble in its corresponding acid, reacting said ester in solution in its corresponding acid with an alkoxide of, the formula:

M'(OR')$_4$ wherein M' is Ti or Zr and R' is an alkyl or a substituted alkyl radical containing 1 to 5 carbon atoms, the reaction resulting in a clear solution, bringing to boil the reaction mixture until the solvent is removed to yield a viscous, translucent resin, solidifying said resin by cooling, crushing said resin or reducing it to a powder by the addition of liquid nitrogen, and subjecting said resin to a slow pyrolysis.

2. A process for preparing barium titanate according to claim 1, comprising the following successive steps:

preparing an ester by reacting BaCO$_3$ with an organic acid of the formula R-COOH wherein R has the designation given above, reacting said ester in solution in its corresponding acid with a titanium alkoxide of the formula Ti-(OR')$_4$ wherein R' has the designation given above, bringing to boil the reaction mixture and evaporating the solvent until the formation of a translucent resin, solidifying said resin by cooling, crushing the soldified resin or reducing it to a powder by addition of liquid nitrogen, and subjecting the resin to a slow pyrolysis so as to obtain the barium titanate.

3. A process according to claim 1 in which the reaction between the ester of the formula:

M (R COO)$_2$ wherein M and R have the respective designations given above and the akoxide of the formula:

M'(OR')$_4$ wherein M' and R' have the respective designations given above is carried out in the presence of an organic solvent able to dissolve said ester.

4. A process according to claim 1 wherein the resin before pyrolysis is put back into solution and then the solution is hydrolyzed in the form of a gel.

5. A process according to claim 1 wherein the resin is subjected to a slow pyrolysis in air by slowly raising the temperature up to between 600° C. and 800° C. within a few hours.

6. A process according to claim 2, characterized in that the acid used for the attack of BaCO$_3$ is propionic acid.

7. A process according to claim 2, characterized in that the barium titanate BaTiO$_3$ is, after treatment of the resin, subjected to a thermal treatment at a temperature of between 600° C. and 700° C.

8. A process according to claim 3, characterized in that the titanium or zirconium alkoxide is dissolved in ethanol or isopropanol.

9. A process according to claim 2, characterized in that the titanium alkoxide is titanium ethoxide.

10. A process according to claim 2, characterized in that the titanium alkoxide is titanium isopropoxide.

11. A process according to claim 2, characterized in that the titanium alkoxide is titanium butoxide.

12. A process according to claim 8, characterized in that the zirconium alkoxide is zirconium isopropoxide.

13. A process according to claim 1, characterized in that the ester of formula

M [H—(CH$_2$)$_n$ CO$_2$[$_2$ in which M designates the strontium or the calcium is prepared by the attack of SrCO$_3$ or CaCO$_3$ with an organic acid of the formula H—(CH$_2$)$_n$—COOH with addition of water, the excess water being subsequently eliminated by progressively adding the same organic acid as that used for the preparation of the ester, while evaporating the water until a substantially total elimination of the latter.

* * * * *